United States Patent
Phillips et al.

(10) Patent No.: US 11,760,492 B2
(45) Date of Patent: Sep. 19, 2023

(54) AIR COOLING

(71) Applicant: Airbus (S.A.S.), Blagnac (FR)

(72) Inventors: Samuel Phillips, Bristol (GB); Thomas James, Bristol (GB); Oliver Family, Bristol (GB); Thomas Fulcher, Bristol (GB); Boris Schwerdt, Taufkirchen (DE)

(73) Assignee: AIRBUS (S.A.S.), Blagnac (FR)

( * ) Notice: Subject to any disclaimer, the term of this patent is extended or adjusted under 35 U.S.C. 154(b) by 95 days.

(21) Appl. No.: 17/463,038

(22) Filed: Aug. 31, 2021

(65) Prior Publication Data

US 2022/0111967 A1    Apr. 14, 2022

(30) Foreign Application Priority Data

Oct. 12, 2020 (GB) ...................................... 2016147

(51) Int. Cl.
| | | |
|---|---|---|
| B64C 3/32 | (2006.01) | |
| B64D 29/02 | (2006.01) | |
| B64D 13/00 | (2006.01) | |
| B64D 13/08 | (2006.01) | |
| B64D 27/24 | (2006.01) | |
| B64D 33/04 | (2006.01) | |

(52) U.S. Cl.
CPC .............. *B64D 13/006* (2013.01); *B64C 3/32* (2013.01); *B64D 13/08* (2013.01); *B64D 27/24* (2013.01); *B64D 29/02* (2013.01); *B64D 33/04* (2013.01); *B64D 2221/00* (2013.01)

(58) Field of Classification Search
CPC .... B64C 3/32; B64C 7/00; B64C 7/02; B64D 29/02
See application file for complete search history.

(56) References Cited

U.S. PATENT DOCUMENTS

| 9,000,295 | B1 | 4/2015 | Graber et al. | |
|---|---|---|---|---|
| 2013/0214538 | A1 | 8/2013 | Himmelmann | |
| 2020/0277062 | A1* | 9/2020 | Becker ................... | B64D 27/06 |

FOREIGN PATENT DOCUMENTS

| EP | 1 367 683 | 12/2003 | |
|---|---|---|---|
| EP | 1 921 310 | 5/2008 | |
| EP | 3 392 149 | 10/2018 | |
| GB | 473341 | 10/1937 | |
| WO | WO-2021064386 A2 * | 4/2021 | ................ B60L 1/02 |

OTHER PUBLICATIONS

European Search Report cited in EP 21190417.2, dated Feb. 4, 2022, 10 pages.
Search Report for GB Application No. 2016147.7 dated Dec. 14, 2020, 4 pages.

* cited by examiner

*Primary Examiner* — Timothy D Collins
*Assistant Examiner* — Justin Michael Heston
(74) *Attorney, Agent, or Firm* — Nixon & Vanderhye P.C.

(57) ABSTRACT

An aircraft including: a wing having a leading edge; an electric motor mounted on the wing; and an electric power cable in the wing for providing power to the electric motor, wherein the electric power cable runs through a duct in the wing; the duct comprises an air inlet and an air outlet; and the electric power cable is cooled by air passing through the duct between the air inlet and the air outlet.

15 Claims, 3 Drawing Sheets

AIR COOLING

RELATED APPLICATION

This application claims priority to United Kingdom patent application GB 2016147.7, filed Oct. 12, 2020, the entirety of which is incorporated by reference.

TECHNICAL FIELD

The present invention relates to the cooling of high voltage cables in an aircraft.

BACKGROUND

Electric and electric-hybrid propulsion is an important area of development in aircraft and provides many benefits. However, replacing more traditional forms of propulsion, such as gas-turbine jet engines and jet-fueled turboprop engines, with alternative electric propulsion alternatives gives rise to many challenges and difficulties that must be overcome.

Electric propulsion, for example a ducted fan driven by an electric motor requires a high voltage provided from a power supply. Distribution of high voltage power around the aircraft to the electric propulsion system provides a number of challenges in itself. Due to weight and free space constraints, the power supply cables must be of a relatively small diameter. However, having smaller diameter cables in turn creates high temperatures due to the high energy passing through the thinner diameter cables.

One solution, as described in U.S. Pat. No. 9,000,295 B1 is to use superconductive high voltage cables which have a flow of a cryogen passing through them such as liquid hydrogen or cryogenic gaseous helium. Whilst such cables provide a high performance solution, they are significantly more expensive, and require complex thermal management systems and cryogen recirculation systems.

Improvements in cable thermal management are therefore required in order that the full benefits of electric and electric-hybrid propulsion in aircraft can be realised.

SUMMARY

A first aspect of the present invention provides an aircraft, comprising: a wing having a leading edge; an electric motor mounted on the wing; and an electric power cable in the wing for providing power to the electric motor. Wherein the electric power cable runs through a duct in the wing; the duct comprises an air inlet and an air outlet; and the electric power cable is cooled by air passing through the duct between the air inlet and the air outlet.

As a result, the electric power cable is cooled effectively by the air passing through the duct in the wing. The cooling can be carried out passively using external air, and this minimises the need for an additional active cooling system which would increase cost, weight and complexity. The effective cooling can also allow the diameter of the cable to be kept to a minimum, which may help to reduce the size, weight and cost of the power cable.

The duct may be in the leading edge of the wing. As a result, the duct is positioned close to an ambient air source, and when the aircraft is in flight, there is a significant air pressure differential at the leading edge to encourage ample cooling airflow through the duct.

The air outlet may be located at an end of the duct near a fuselage of the aircraft. As such, this allows for cooling along substantially the full span of the electrical cable from the electric motor to the fuselage of the aircraft.

The air outlet may be positioned in a fuselage-to-wing fairing of the aircraft.

The electric motor may be mounted to the wing by way of a pylon, the pylon comprising a pylon leading edge and the duct may extend at least partially through the pylon. As such, the part of the electric cable that passes through the pylon will also benefit from cooling by the air passing through the duct.

The electric motor may power a fan, and the air inlet may be provided in the electric motor within an airflow downstream of the fan. As a result, cooling airflow through the duct can be generated by the fan both when the aircraft is in flight as well as on the ground.

The air inlet may be located in the pylon leading edge. As such, ambient air is forced into the air inlet when the aircraft is in flight.

The duct may be coupled to the cabin air supply to provide heating for the cabin. This can provide efficient heating of the cabin and reduces waste energy.

The duct may be coupled to ancillary systems in the aircraft for providing heating to the ancillary systems. This can provide efficient heating of the ancillary systems and reduces waste energy.

The air outlet may comprise an exhaust vent on the wing at the wing root for exhausting air from the channel. As a result, the cooling air passes through the full length of the duct, and the cable benefits from effective cooling across its full length until it reaches the aircraft fuselage.

A second aspect of the invention provides a method for cooling an electrical power cable in an aircraft, the aircraft comprising a wing, the method comprising providing the electric power cable through a duct in the wing, the duct comprising an air inlet and an air outlet; and passing cooling air through the duct between the air inlet and the air outlet.

The electrical power cable may provide power to an electric motor that powers a fan, and the method may further comprise extracting cooling air from an airflow downstream of the fan to pass through the duct.

The method may further comprise coupling the airflow in the duct to the cabin air supply for use in heating the cabin air.

The method may further comprise coupling the airflow in the duct to ancillary systems in the aircraft for use in heating the ancillary systems.

BRIEF DESCRIPTION OF THE DRAWINGS

Embodiments of the invention will now be described, by way of example only, with reference to the accompanying drawings, in which.

DETAILED DESCRIPTION

Figure 1:
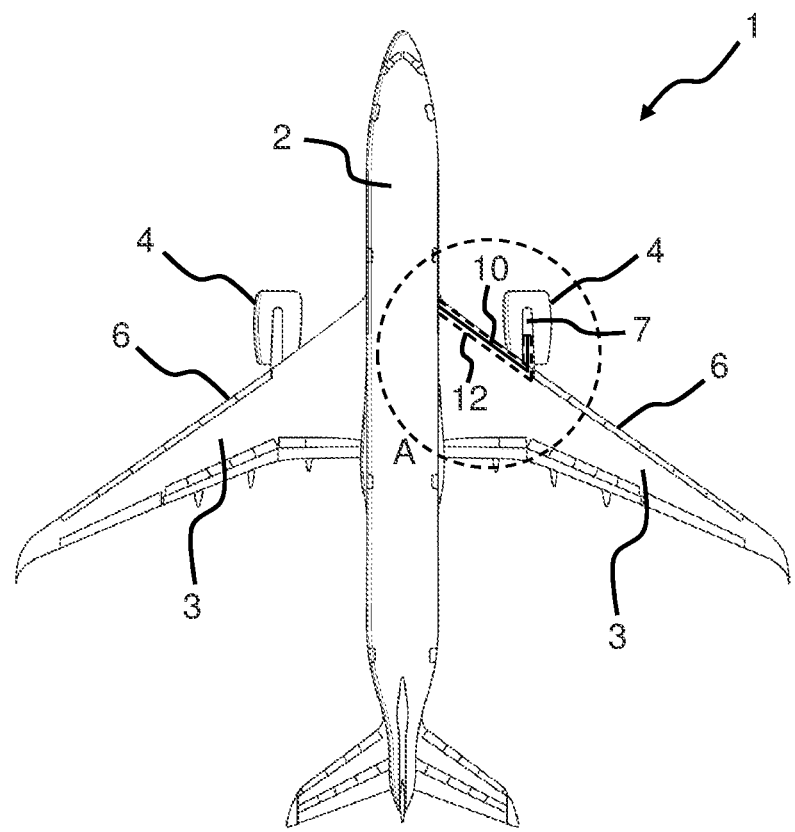
FIG. 1 is an above view of an example aircraft according to the invention.
Figure 2:
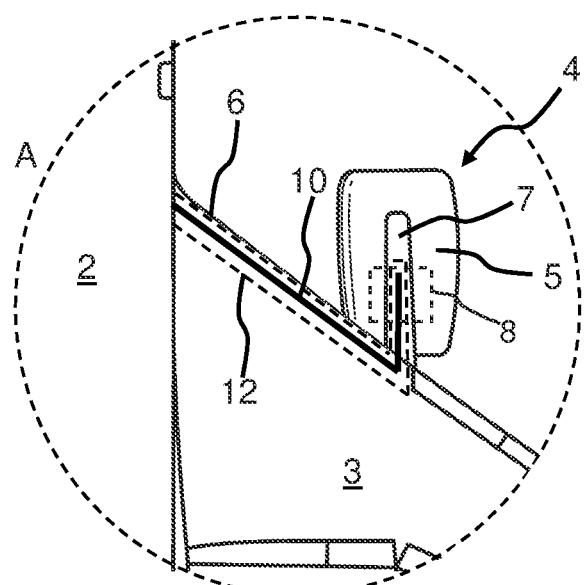
FIG. 2 is a magnified view of the portion of FIG. 1 within the dotted line circle of FIG. 1.
Figure 3:
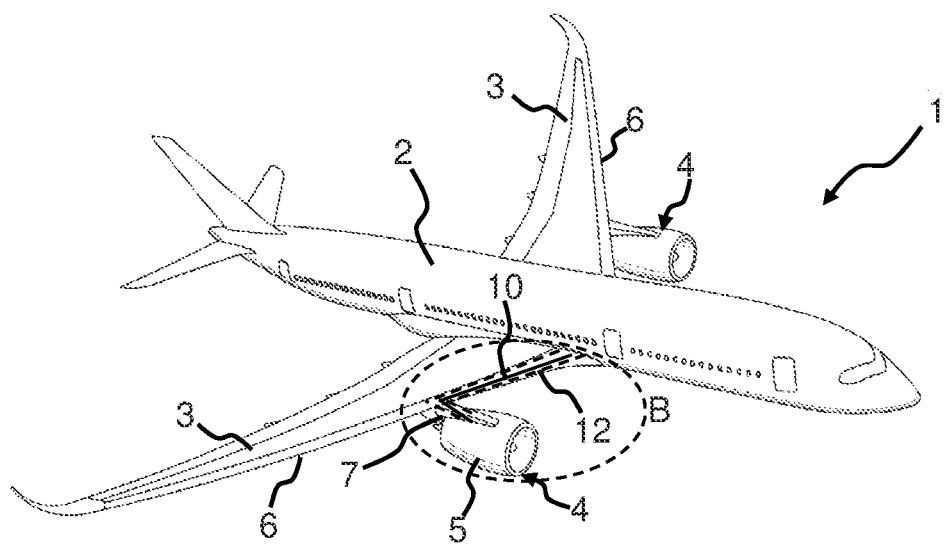
FIG. 3 is a perspective view of an example aircraft according to the invention.
Figure 4:
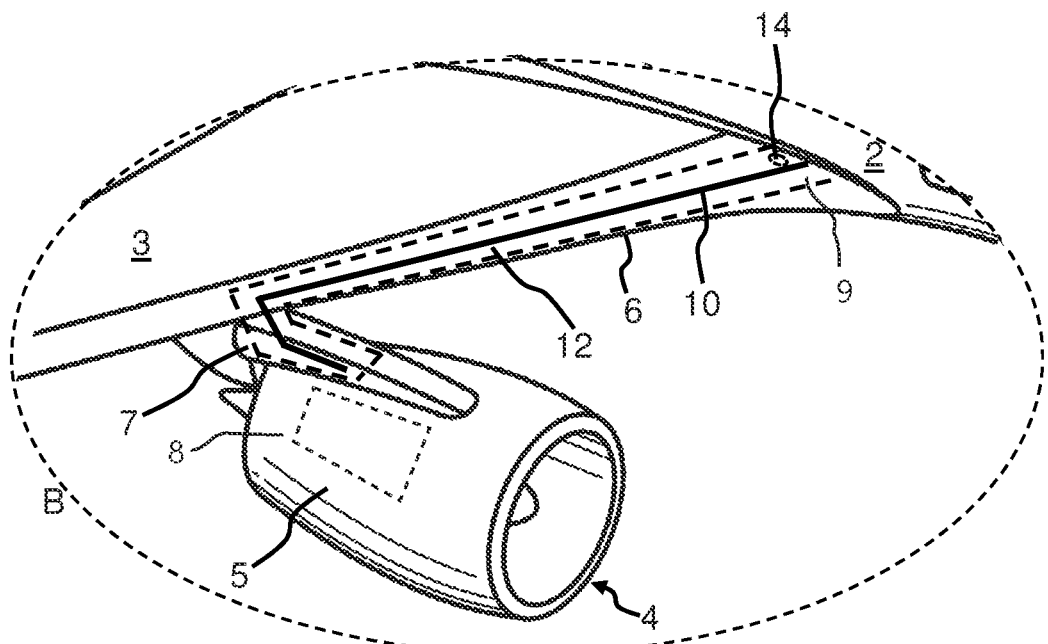
FIG. 4 is a magnified view of the portion of FIG. 3 within the dotted line oval of FIG. 3.

FIG. 1 shows an aircraft 1 having a fuselage 2 and wings 3. FIG. 2 shows an enlarged view of part of the aircraft 1 of FIG. 1, indicated by the dotted circle A. FIG. 3 shows a perspective view of the aircraft 1 of FIG. 1, and FIG. 4 shows an enlarged view of part of FIG. 3, indicated by the dotted oval B.

Attached to the wings 3 are propulsion engines 4 which provide thrust to move the aircraft in flight and, optionally, on the ground. Each propulsion engine 4 comprises a ducted fan driven by an electric motor 8 housed within a nacelle 5. The wings 3 each have a leading edge 6 at the front of the wing 3, and the propulsion engine 4 is attached to the wing 3 by way of a pylon 7.

Electric power is provided to drive the electric motors 8 from a power source, which for example may be one or more of a combination of an energy storage solution such as batteries, hydrogen cells, or a hybrid power generating system. The power source in the present example is located in the fuselage 2 of the aircraft 1. However, alternatively, the power source could be provided in other parts of the aircraft, and may be split into more than one source and distributed across a number of different parts of the aircraft 1.

Electrical power is transferred from the power source to the electric motors 8 in the propulsion engine 4 by way of high voltage electrical cables. An example of one of the high voltage electrical cables is shown schematically in the FIGS. 1 to 4 as cable 10. The cable 10 runs through the inside the leading edge 6 of the wing 3 through a duct 12. The cable 10 extends from the fuselage 2 through duct 12 inside the leading edge 6 of the wing 3 and then passes through the pylon 7 into the nacelle 5 where it connects with the propulsion engine 4. The duct 12 also extends through the pylon 7.

The duct 12 provides a channel through which air can flow in order to provide cooling to the cable 10. Air enters the duct through an air inlet (not shown), and passes along the length of the duct 12, and finally leaving the duct through air outlet 14 as shown in FIG. 4. The air outlet 14 is an exhaust vent provided at the wing root where the wing 3 connects to the fuselage 2.

The air inlet and outlet are positioned such that the pressure difference between them generates sufficient airflow through the duct to cool the high voltage cables. Alternative embodiments may have the air inlet and outlet positioned differently. For example, the outlet may be located above or below the wing, and may be positioned on a fuselage-to-wing fairing 9 of an aircraft.

This passive air cooling solution provides sufficient cooling to the high voltage cables, but without requiring a complex and expensive active cooling system that may need a heat exchanger, pump and coolant reservoir for example.

Figure 5:
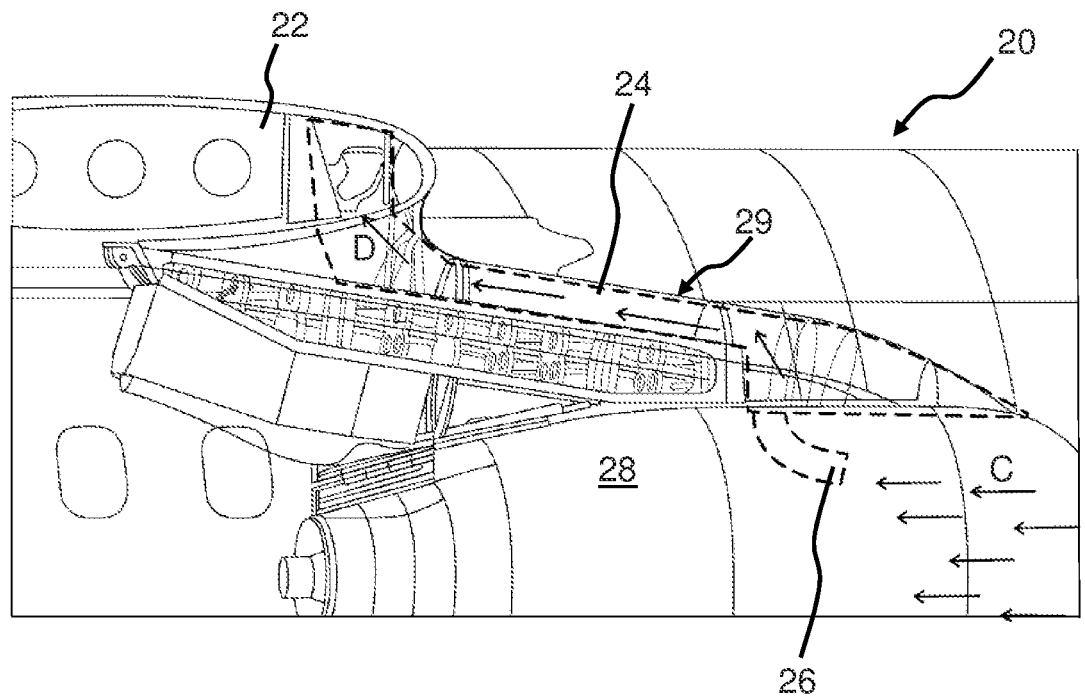
FIG. 5 is a schematic view through part of an aircraft wing showing a first embodiment of the invention.

FIG. 5 shows a schematic view of part of an aircraft 20, the view showing a cross section through part of the wing 22, and schematically showing an air duct 24 and air inlet 26 of one embodiment. The inlet 26 extends inside the nacelle 28 and is located downstream of the fan (not shown), such that it is positioned within the airflow represented by arrows C. Part of the airflow generated by the fan passes into the inlet 26 and flows into and through the duct 24, as represented by arrows D. The duct 24 extends through the pylon 29 and then upwards into the leading edge of the wing 22. The duct then extends along the leading edge of the wing 22 towards the fuselage of the aircraft 20.

The pylon 29 is shown partially transparent in the Figure to aid clarity. High voltage cables, which are not shown in FIG. 5 to simplify the diagram run through the duct 24 and then pass into the nacelle 28 to provide power to the electric motor (8 in FIG. 2) housed within. Current passing through the high voltage cables causes them to heat up. The flow of air D through the duct 24 cools the high voltage cables. Heat from the cables is passed to the air in the airflow D, which draws it away from the cables, along the duct, and then out of an air outlet or exhaust vent at the end of the duct.

By having the air inlet 26 located inside the nacelle 28 behind the fan, the fan can be used to generate the airflow D to cool the high voltage cables, both when the aircraft 20 is on the ground and also in flight.

Figure 6:
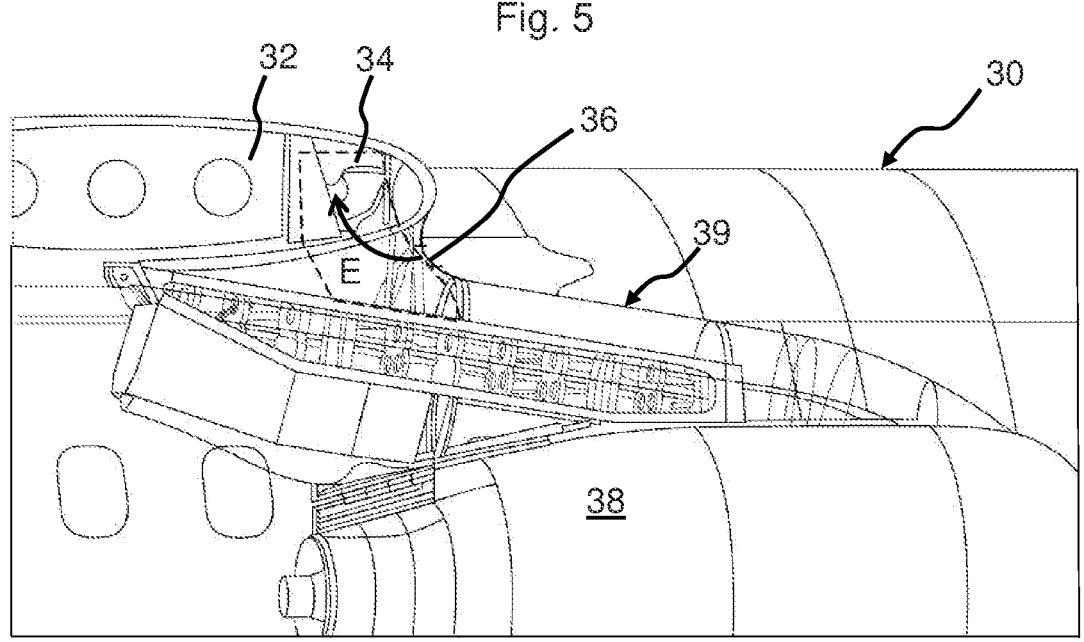
FIG. 6 is a schematic view through part of an aircraft wing showing a second embodiment of the invention.

FIG. 6 shows a schematic view of part of another aircraft 30, the view showing a cross section through part of the wing 32, and schematically showing an air duct 34 and air inlet 36 of an alternative embodiment. In this alternative embodiment, the duct 34 partially extends into the pylon 39, and the inlet 36 is positioned in the leading edge of the pylon 39. A cooling airflow E through the duct 34 is generated during flight as the aircraft 30 is moving because the air inlet 36 faces forward in the direction of flight. Ambient air from outside the aircraft therefore enters the air inlet 36 and flows into and through the duct 34, as represented by the arrow E. The duct 34 passes through a short section of the pylon 39 and then upwards into the leading edge of the wing 32. As with the previously described embodiment, the duct 34 then extends along the leading edge of the wing 32 towards the fuselage of the aircraft 30.

The pylon 39 is shown partially transparent in the figure to aid clarity. High voltage cables, which are not shown in FIG. 6 to simplify the diagram run through the duct 34 and then pass into the nacelle 38 to provide power to the electric motor (8 in FIG. 2) housed within. Current passing through the high voltage cables causes them to heat up. The flow of air E through the duct 24 cools the high voltage cables. Heat from the cables is passed to the air in the airflow D, which draws it away from the cables, along the duct, and then out of an air outlet or exhaust vent (not shown) at the end of the duct.

In all of these embodiments described, the air flowing through the duct draws heat away from the high voltage cables to help cool them. This means that the air flowing through the duct will itself warm or heat up. The air can then be exhausted back into the ambient air outside of the aircraft through an exhaust vent or air outlet. However, it may be beneficial to utilise the heat generated. For example, the warmed air from the duct may be used to warm the cabin air inside the fuselage. This may be done by coupling the airflow from the duct to the cabin air supply in order to help heat the cabin air. This ensures that the heat energy from the high voltage cables is utilised, and not wasted.

Alternatively, or additionally, the airflow from the duct that has been heated by the high voltage cables may beneficially be used to heat auxiliary and/or ancillary systems of the aircraft. This also ensures that the heat energy from the high voltage cables is utilised, and not wasted.

Although the invention has been described above with reference to one or more preferred examples or embodiments, it will be appreciated that various changes or modifications may be made without departing from the scope of the invention as defined in the appended claims.

For instance, the aircraft may comprise a mixture of propulsion types, with one or more being electric or hybrid propulsion engines, and one or more being more traditional gas turbine jet engines. In addition, although the embodiments described herein have described the propulsion engine as being an electric ducted fan driven by an electric motor, it will be understood that the propulsion engine may alternatively be a different type of electric or hybrid propulsion engine, such as a propeller driven by an electric motor.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a wing having a leading edge;
a fuselage to which the wing is attached;
an electric motor mounted on the wing;
an electric power cable in the wing configured to provide power to the electric motor; and
a duct in the wing extending from the electrical motor towards the fuselage,
wherein the electric power cable runs through the duct,
wherein the duct comprises an air inlet and an air outlet;
wherein the electric power cable is cooled by air passing through the duct between the air inlet and the air outlet, and
wherein the air outlet is positioned in a fuselage-to-wing fairing of the aircraft.

2. The aircraft according to claim 1, wherein the duct is in the leading edge of the wing.

3. The aircraft according to claim 1, wherein the electric motor is mounted to the wing by way of a pylon comprising a pylon leading edge and wherein the duct extends at least partially through the pylon.

4. The aircraft according to claim 3, wherein the electric motor powers a fan.

5. The aircraft according to claim 3, wherein the air inlet is located in the pylon leading edge.

6. The aircraft according to claim 1, wherein the duct is coupled to a cabin air supply to provide heating for a cabin within the fuselage.

7. The aircraft according to claim 1, wherein the duct is coupled to an ancillary system in the aircraft for providing heating to the ancillary system.

8. A method for cooling an electrical power cable in an aircraft with a wing, the method comprising:
delivering electric power via the electrical power cable to an electric motor that powers a fan mounted to the wing;
providing thrust from the fan to fly the aircraft;
providing the electric power cable through a duct in the wing, the duct comprising an air inlet and an air outlet;
passing cooling air through the duct between the air inlet and the air outlet, and
exhausting the cooling air from the duct though the air outlet in a fuselage-to-wing fairing of the aircraft.

9. The method according to claim 8 wherein the method further comprises extracting the cooling air from an airflow downstream of the fan to pass through the duct.

10. The method according to claim 8, wherein the method further comprises coupling the airflow in the duct to a cabin air supply configured to heat cabin air in a cabin of the aircraft.

11. The method according to claim 8, wherein the method further comprises coupling the airflow in the duct to ancillary systems in the aircraft for use in heating the ancillary systems.

12. An aircraft comprising:
a fuselage;
a wing extending from the fuselage and including a leading edge;
a pylon extending downward from a lower surface of the wing;
a nacelle attached to the pylon;
an electric motor within the nacelle and configured to drive a fan within the nacelle, wherein the fan provides aerodynamic thrust to the aircraft;
a duct within the pylon and the leading edge, and extending from the pylon, through the leading edge to the fuselage;
an electric power cable electrically coupled to the motor and extending through the duct to the fuselage, wherein the electric power cable is configured to delivery electrical energy to power the motor;
an air inlet to the duct on the pylon; and
an air outlet from the duct on a fairing covering a joint between the wing and the fuselage.

13. The aircraft according to claim 12, the air inlet is located in a leading edge of the pylon.

14. The aircraft according to claim 12, wherein the duct is coupled to a heat exchanger in a cabin air supply system and the heat exchanger is configured to heat air ducted to a cabin within the fuselage.

15. The aircraft according to claim 12, wherein the air outlet comprises an exhaust vent on the wing at a wing root.

* * * * *